United States Patent
Miyashita et al.

(10) Patent No.: US 7,569,965 B2
(45) Date of Patent: Aug. 4, 2009

(54) STATOR FOR MOTOR

(75) Inventors: Toshihito Miyashita, Nagano (JP); Hiroshi Hioki, Nagano (JP)

(73) Assignee: Sanyo Denki Co., Ltd., Tokyo (JP)

( * ) Notice: Subject to any disclaimer, the term of this patent is extended or adjusted under 35 U.S.C. 154(b) by 33 days.

(21) Appl. No.: 12/029,628

(22) Filed: Feb. 12, 2008

(65) Prior Publication Data
US 2008/0191576 A1    Aug. 14, 2008

(30) Foreign Application Priority Data

Feb. 13, 2007 (JP) ............................. 2007-031918
Feb. 8, 2008 (JP) ............................. 2008-029187

(51) Int. Cl.
*H02K 3/46* (2006.01)
*H02K 1/18* (2006.01)

(52) U.S. Cl. ...................... 310/194; 310/216; 310/218
(58) Field of Classification Search ................. 310/194, 310/216, 218, 254
See application file for complete search history.

(56) References Cited

U.S. PATENT DOCUMENTS

| 6,194,806 | B1 | 2/2001 | Suzuki et al. | |
|---|---|---|---|---|
| 6,348,753 | B1 * | 2/2002 | Sakai et al. | 310/254 |
| 6,483,221 | B1 * | 11/2002 | Pawellek et al. | 310/216 |
| 6,573,632 | B2 * | 6/2003 | Hsu | 310/216 |
| 6,737,782 | B2 * | 5/2004 | Suzuki et al. | 310/194 |
| 7,122,934 | B2 * | 10/2006 | Yamamoto et al. | 310/218 |
| 7,528,519 | B2 * | 5/2009 | Miyashita | 310/216.001 |
| 2001/0030486 | A1 * | 10/2001 | Pijanowski | 310/254 |
| 2003/0127933 | A1 * | 7/2003 | Enomoto et al. | 310/194 |
| 2006/0071569 | A1 * | 4/2006 | Stewart et al. | 310/194 |
| 2007/0063610 | A1 * | 3/2007 | Miyashita | 310/218 |
| 2007/0080600 | A1 * | 4/2007 | Miyashita et al. | 310/218 |

FOREIGN PATENT DOCUMENTS

| EP | 1128524 | 8/2001 |
|---|---|---|
| EP | 1772944 | 4/2007 |
| JP | 2001-327109 | 11/2001 |

* cited by examiner

*Primary Examiner*—Tran N Nguyen
(74) *Attorney, Agent, or Firm*—Rankin, Hill & Clark LLP

(57) ABSTRACT

A projecting portion 23*h* is integrally provided at a first connecting portion 23*e* of a bobbin 23. The projecting portion 23*h* has a triangular cross-section taken in an orthogonal direction orthogonal to a laminating direction of the steel plates 21 and parallel to magnetic steel plates 21. The section of the projecting portion is geometrically similar in shape to a cross-section of a fitting recessed portion 7*a* taken in the orthogonal direction. The cross-section of the projecting portion 23*h* is substantially the same in size as or slightly smaller than the cross-section of the fitting recessed portion 7*a*. With this arrangement, when one ends of six magnetic columns 13 of a magnetic pole constituent member 9 are brought into engagement with six fitting recessed portions 7*a*, projecting portions 23*h* passes through the fitting recessed portions 7*a* and come out of the fitting recessed portions 7*a*.

11 Claims, 10 Drawing Sheets

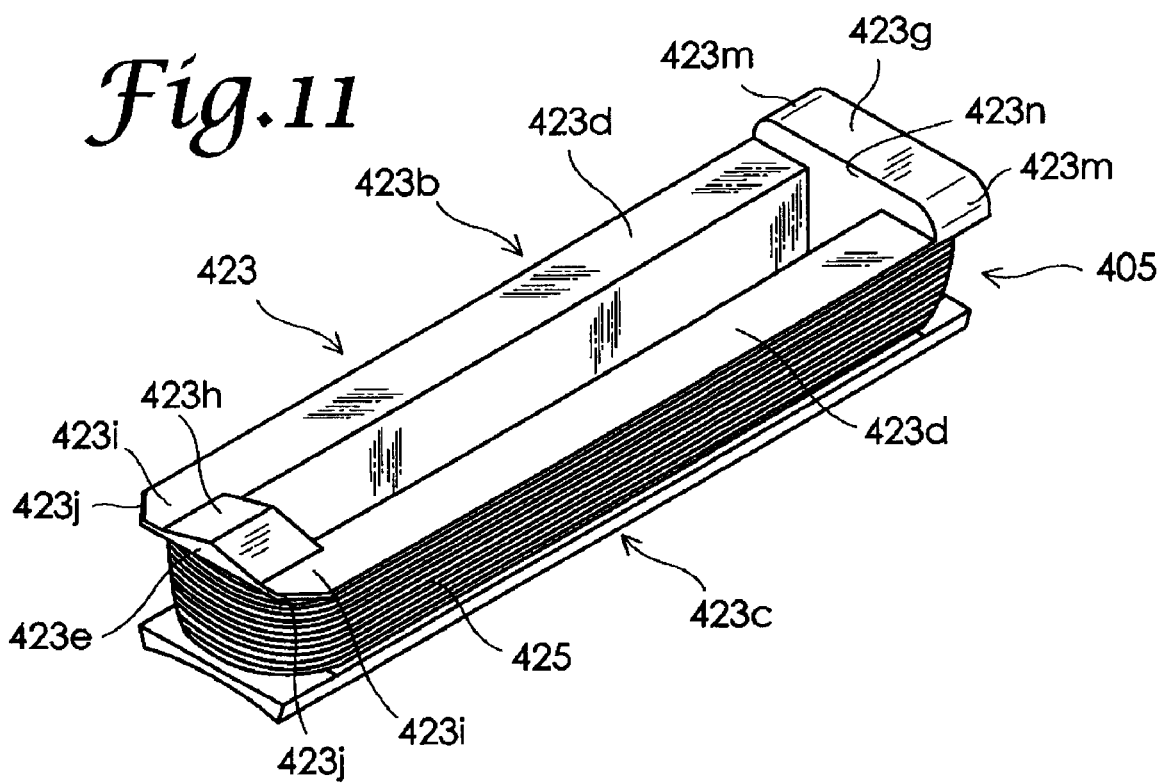

STATOR FOR MOTOR

FIELD OF THE INVENTION

The present invention relates to a stator for a motor.

BACKGROUND OF THE INVENTION

Japanese Patent No. 3811179 (hereinafter referred to as Patent Document 1) discloses a stator for a motor comprising a stator core including an annular yoke and a magnetic pole constituent member fitted inside the annular yoke, and a plurality of excitation winding portions. The magnetic pole constituent member includes a plurality of pole columns connected to the yoke, with the excitation winding portions wound therearound, a plurality of magnetic pole surface forming portions each including a magnetic pole surface, and a plurality of connecting sections each of which connects adjacent two magnetic pole surface forming portions. In an inner peripheral portion of the yoke, a plurality of fitting recessed portions are formed. The fitting recessed portions are open toward the magnetic pole constituent member and outer ends of the pole columns are fitted into the fitting recessed portions, respectively. In the inner peripheral portion of the yoke, a pair of or paired flat-surface portions, which are respectively continuous with an inner surface of a corresponding fitting recessed portion, are respectively formed on either side of the corresponding fitting recessed portion in a circumferential direction of the yoke. Each excitation winding portion includes a bobbin and a winding conductor wound around the bobbin. The bobbin is made of an insulating material and fitted with a corresponding pole column. This bobbin integrally includes a cylindrical portion that is fitted with the corresponding pole column, with the winding conductor wound therearound, a first flange portion that is provided at one end portion of the cylindrical portion and includes a pair of or paired flat portions which come into contact with the paired flat-surface portions of the yoke, and a second flange portion that is provided at the other end portion of the cylindrical portion and comes into contact with a corresponding magnetic pole surface forming portion.

In the stator core of such a type, in order to increase a space for the winding conductor wound around the cylindrical portion of the bobbin, it is necessary to reduce the thicknesses of the flange portions of the bobbin. In other words, in order to increase the volume which is occupied by the winding conductor wound around the cylindrical portion of the bobbin in the space within a slot, the thicknesses of the flange portions of the bobbin need to be reduced. However, when the thickness of the flange portions of the bobbin is reduced, the bobbin may be deformed or broken due to a stress when the winding conductor is wound. As a result, electrically insulating effect of the bobbin may be reduced, or the bobbin with the winding conductor wound therearound may not be able to be fitted with the corresponding pole column. Thus, in a conventional bobbin constituent member, there is a limit to reduction of the thicknesses of the flange portions of the bobbin.

SUMMARY OF THE INVENTION

An object of the present invention is therefore to provide a stator for a motor in which the volume occupied by a winding conductor wound around a bobbin may be kept large, and deformation or breakage of the bobbin may also be prevented when the winding conductor is wound around the bobbin.

Another object of the present invention is to provide a stator for a motor in which, when a magnetic pole constituent member is fitted into a yoke, the bobbin may not be an obstacle in fitting the magnetic pole constituent member to the yoke.

A stator for a motor, of which improvement is aimed at by the present invention comprises: a stator core including an annular yoke and a magnetic pole constituent member fitted inside the annular yoke; and a plurality of excitation winding portions disposed at the magnetic pole constituent member. The magnetic pole constituent member includes a plurality of pole columns, a plurality of magnetic pole surface forming portions, and a plurality of connecting sections. The pole columns are disposed inside the annular yoke at intervals in a circumferential direction of the yoke. Each of the pole columns has an outer end connected to the yoke and an inner end located more inward than the outer end in a radial direction of the yoke. The excitation winding portions are mounted onto the pole columns, respectively. The magnetic pole surface forming portions are respectively disposed at the inner ends of the pole columns and have a magnetic pole surface. A plurality of connecting sections respectively connect adjacent two of the magnetic pole surface forming portions. The yoke and the magnetic pole constituent member are respectively formed by lamination of a plurality of magnetic steel plates. A plurality of fitting recessed portions are formed in an inner peripheral portion of the yoke. The fitting recessed portions are open toward both sides a laminating direction of the magnetic steel plates and also open toward the magnetic pole constituent member. The outer ends of the pole columns are fitted into the fitting recessed portions, respectively. In the inner peripheral portion of the yoke, a pair of or paired flat-surface portions, which are respectively continuous with an inner surface of the fitting recessed portions, are respectively disposed on either side of the fitting recessed portion in the circumferential direction. In other words, one of flat-surface portions in the pair is disposed at one side of the fitting recessed portion and the other flat-surface portion in the pair is disposed on the other side of the fitting recessed portion. Each of the excitation winding portions includes a bobbin that is fitted into a corresponding one of the pole columns and a winding conductor wound around the bobbin. The bobbin is made of an insulating material. The bobbin integrally includes a cylindrical portion, a first flange portion, and a second flange portion. The cylindrical portion is fitted with the corresponding one of the pole columns. The winding conductor is wound around the cylindrical portion. The first flange portion is disposed at one end of the cylindrical portion and has a pair of flat portions or paired flat portions that come into contact with the paired flat-surface portions of the yoke, respectively. The second flange portion comes into contact with a corresponding one of the magnetic pole surface forming portions. The second flange portion is disposed at the other end of the cylindrical portion. In the present invention, the first flange portion includes a first connecting portion that connects corresponding ends of the paired flat portions and a second connecting portion that connects other corresponding ends of the paired flat portions. Then, a projecting portion is integrally provided at the first connecting portion. When the outer ends of the pole columns of the magnetic pole constituent member respectively come into engagement with the fitting recessed portions, the projecting portion passes through a corresponding one of the fitting recessed portions and comes out from that corresponding fitting recessed portion. The projecting portion comes out from an opening portion of the fitting recessed portion that opens toward one side of the laminating direction.

When the projecting portion is integrally provided at the first connecting portion, as in the present invention, the thickness of the first connecting portion is increased by the thickness of the projecting portion. Thus, mechanical strength of the first flange portion may be increased. Accordingly, when the winding conductor is wound around the bobbin, deformation and breakage of the bobbin may be prevented, while keeping large the volume which is occupied by the winding conductor wound around the bobbin.

The projecting portion has a cross-section taken in an orthogonal direction orthogonal to the laminating direction of the magnetic steel plates and parallel to the magnetic steel plates. Preferably, the cross-section of the projecting portion is geometrically similar in shape to a cross-section of the fitting recessed portion taken in the orthogonal direction. With this arrangement, the thickness of the first connecting portion may be increased as much as possible due to presence of the projecting portion.

When the outer end of the pole column is fitted into the fitting recessed portion, if the cross-sectional shape of the projecting portion is geometrically similar to that of the fitting recessed portion so that the inner surface of the fitting recessed portion may come into contact with an outer surface of the projecting portion, the thickness of the first connecting portion may be increased to the maximum extent due to presence of the projecting portion.

Preferably, the second connecting portion of the first flange portion may be integrally provided with a stopper portion that abuts against the yoke when the outer ends of the pole columns are completely fitted into the fitting recessed portions, respectively. With this arrangement, when the outer ends of the pole columns of the magnetic pole constituent member are fitted into the fitting recessed portions, the stopper portions abut against the yoke. With this arrangement, by confirming the position of the stopper portion relative to the yoke, positioning of the magnetic pole constituent member maybe readily confirmed. Further, the stopper portion increases the thickness of the second connecting portion, thereby increasing mechanical strength of the second connecting portion.

A pair of ribs or paired ribs may be integrally formed at the paired flat portions of the bobbin, respectively, along a through hole of the bobbin into which the pole column is fitted. In this case, the inner surface of the fitting recessed portion is formed of a pair of inclined-flat-surface portions or paired inclined-flat-surface portions respectively continuous with the paired flat-surface portions. Then, the paired inclined-flat-surface portions are defined in size so that a pair of spaces may be formed between the outer end of the pole column and the paired inclined-flat-surface portions. The paired ribs of the bobbin are fitted into the pair of spaces, respectively. With this arrangement, the thicknesses of the paired flat portions of the bobbin are partially increased due to presence of the paired ribs. Consequently, the mechanical strength of the first flange portion may be further increased.

Preferably, a leading end region of the first connecting portion may be defined in shape so that the width of the leading end region of the first connecting portion, as measured in a direction where the paired flat portions are arranged, gradually increases more toward the paired flat portions. With this shape definition, both corner portions of the leading end region of the first connecting portion abut against the yoke when the magnetic pole constituent member is fitted into the yoke. As a result, the bobbin may not be an obstacle which prevents fitting of the magnetic pole constituent member into the yoke. Specifically, tapered (inclined) surfaces may be formed at both corner portions of the leading end region of the first connecting portion in the width direction of the first connecting portion. The distance between the tapered surfaces increases more toward the paired flat portions. Alternatively, the corner portions of the leading end region may be rounded, or the corner portions of the leading end region may be curved into a convex shape.

According to the present invention, the projecting portion is integrally provided at the first connecting portion of the first flange portion of the bobbin. The thickness of the first connecting portion may be therefore increased due to presence of the projecting portion. Consequently, the mechanical strength of the first flange portion maybe increased. For this reason, when the winding conductor is wound around the bobbin, deformation and breakage of the bobbin may be prevented, while keeping large the volume which is occupied by the winding conductor wound around the bobbin.

BRIEF DESCRIPTION OF THE DRAWINGS

These and other objects and many of the attendant advantages of the present invention will be readily appreciated as the same becomes better understood by reference to the following detailed description when considered in connection with the accompanying drawings.

FIG. 11 is a perspective view of an excitation winding portion used in a stator for a motor according to still another embodiment of the present invention.

DETAILED DESCRIPTION OF PREFERRED EMBODIMENTS

Figure 1:
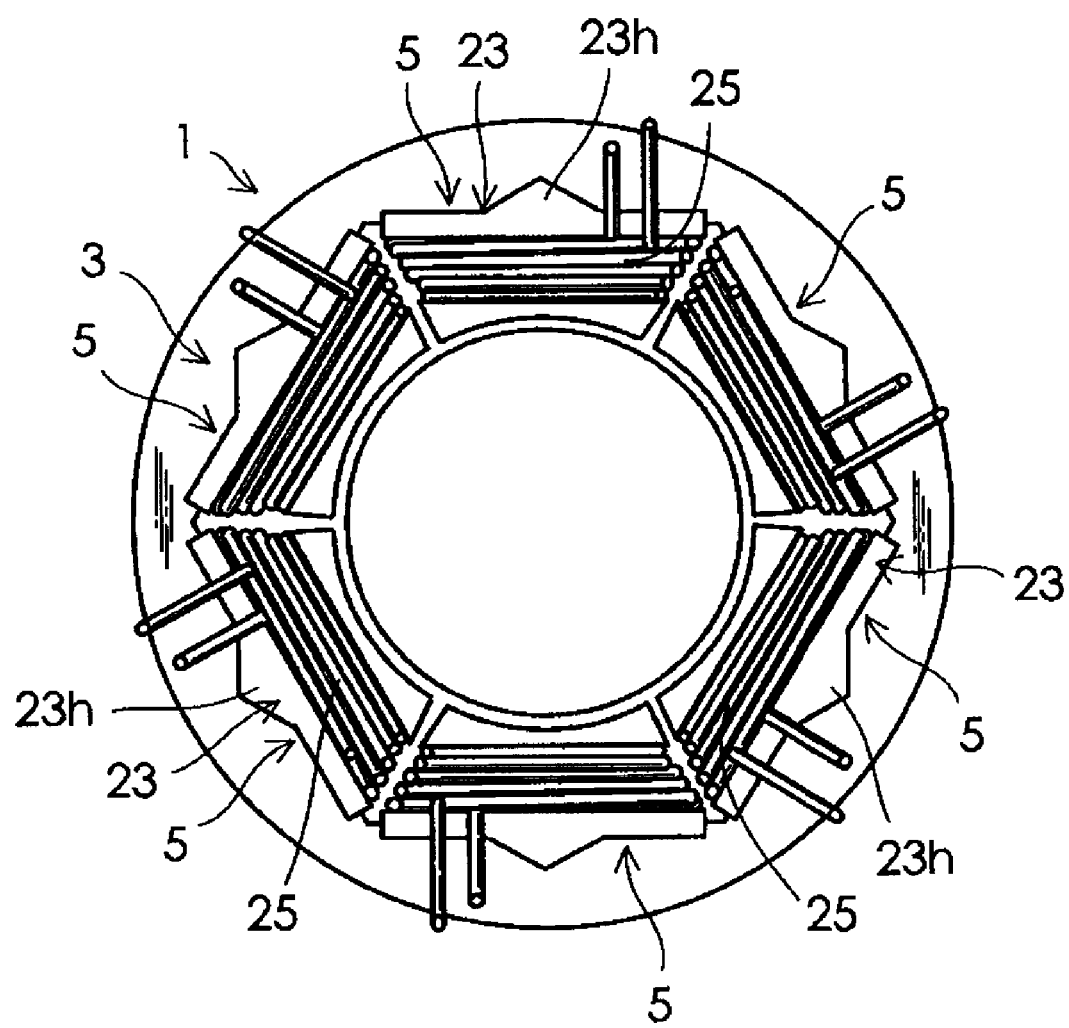
FIG. 1 is a front view of a stator for a motor according to a first embodiment of the present invention.
Figure 2:
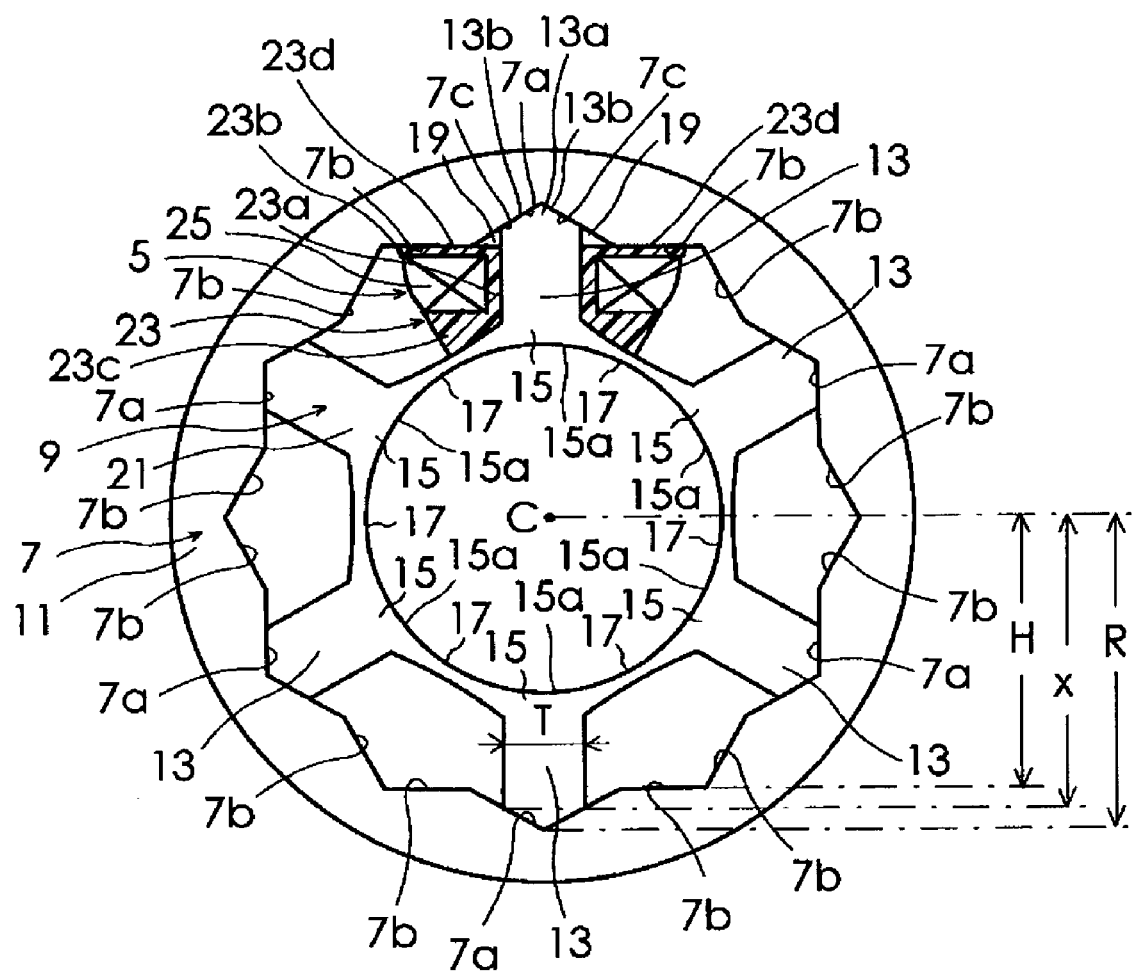
FIG. 2 is a front view of a stator core used in the stator shown in FIG. 1.

Embodiments of the present invention will be described in detail with reference to the accompanying drawings. FIG. 1 is a front view of a stator for a according to a first embodiment of the present invention. As shown in FIG. 1, a stator 1 for a motor in this embodiment comprises a stator core 3 and six excitation winding portions 5. As shown in FIG. 2, the stator core 3 includes an annular yoke 7 and a magnetic pole constituent member 9 disposed inside the annular yoke 7. For convenience, only one excitation winding portion 5 is shown in FIG. 2. The yoke 7 is formed by lamination of a plurality of magnetic steel plates 11 for a yoke. A cross-section of an outer peripheral portion of the yoke 7, as taken in a direction orthogonal to a laminating direction of the magnetic steel plates 11 for a yoke, is circular in shape. A cross-section of an inner peripheral portion of the yoke 7, as taken in the direction orthogonal to the laminating direction of the magnetic steel plates 11 for a yoke, is a regular hexagon in shape where six fitting recessed portions 7a are respectively formed substantially in the center of each side of the regular hexagon. The fitting recessed portions 7a are formed in the inner peripheral portion of the yoke 7 so as to be open toward both side of the laminating direction of the magnetic steel plates and also toward the magnetic pole constituent member 9 (or in a radially inward direction of the yoke 7). In the inner peripheral portion of the yoke 7, a pair of or paired flat-surface portions 7b are respectively formed on either side of the fitting recessed portion 7a in a circumferential direction of the yoke. In other words, one of the flat-surface portions 7b in the pair is formed on one side of the fitting recessed portion 7a and the other flat-surface portion 7b in the pair is formed on the other side of the fitting recessed portion 7a. Each flat-surface portion 7b is continuous with an inner surface of a corresponding fitting recessed portion 7a. The paired flat-surface portions 7b have the same side length that extend in the circumferential direction of the yoke 7 and exist on the same virtual plane. An inner surface of the fitting recessed portion 7a is formed of a pair of or paired inclined-flat-surface portions 7c respectively continuous with the paired flat-surface portions 7b.

The magnetic pole constituent member 9 includes six pole columns 13, magnetic pole surface forming portions 15 each disposed at an end portion of a corresponding pole column 13, and six connecting sections 17 each of which connects adjacent two magnetic pole surface forming portions 15. The pole columns 13 are disposed inside the yoke 7 at intervals in the circumferential direction of the yoke 7. Each pole column 13 includes an outer end connected to the yoke 7 and an inner end located more inward than the outer end in a radial direction of the yoke. In this embodiment, an outer end of the pole column 13 is formed of a triangular raised portion 13a. For this reason, the raised portion 13a has a pair of or paired inclined surfaces 13b that extend in the circumferential direction of the yoke 7. Then, the raised portion 13a is fitted into the fitting recessed portion 7a of the yoke 7 and the pole column 13 is connected to the yoke 7 so that the paired inclined surfaces 13b and the paired inclined-flat-surface portions 7c of the yoke 7a but against each other. In this embodiment, the length of an inclined surface 13b in the circumferential direction of the yoke 7 is shorter than that of an inclined-flat-surface portion 7c in the circumferential direction of the yoke 7. For this reason, some parts of the paired inclined-flat-surface portions 7c are exposed toward the pole column 13. Between the exposed parts of the paired inclined-flat-surface portions 7c and the pole column 13, a pair of groove-like spaces 19 that extend in the laminating direction are formed. Each groove-like space has a triangular cross-section. The magnetic pole surface forming portion 15 is provided at the inner end of the pole column 13 and includes a magnetic pole surface 15a that faces the rotor. A rotor not shown is disposed in a region surrounded by the magnetic pole surfaces 15a.

Figure 3:
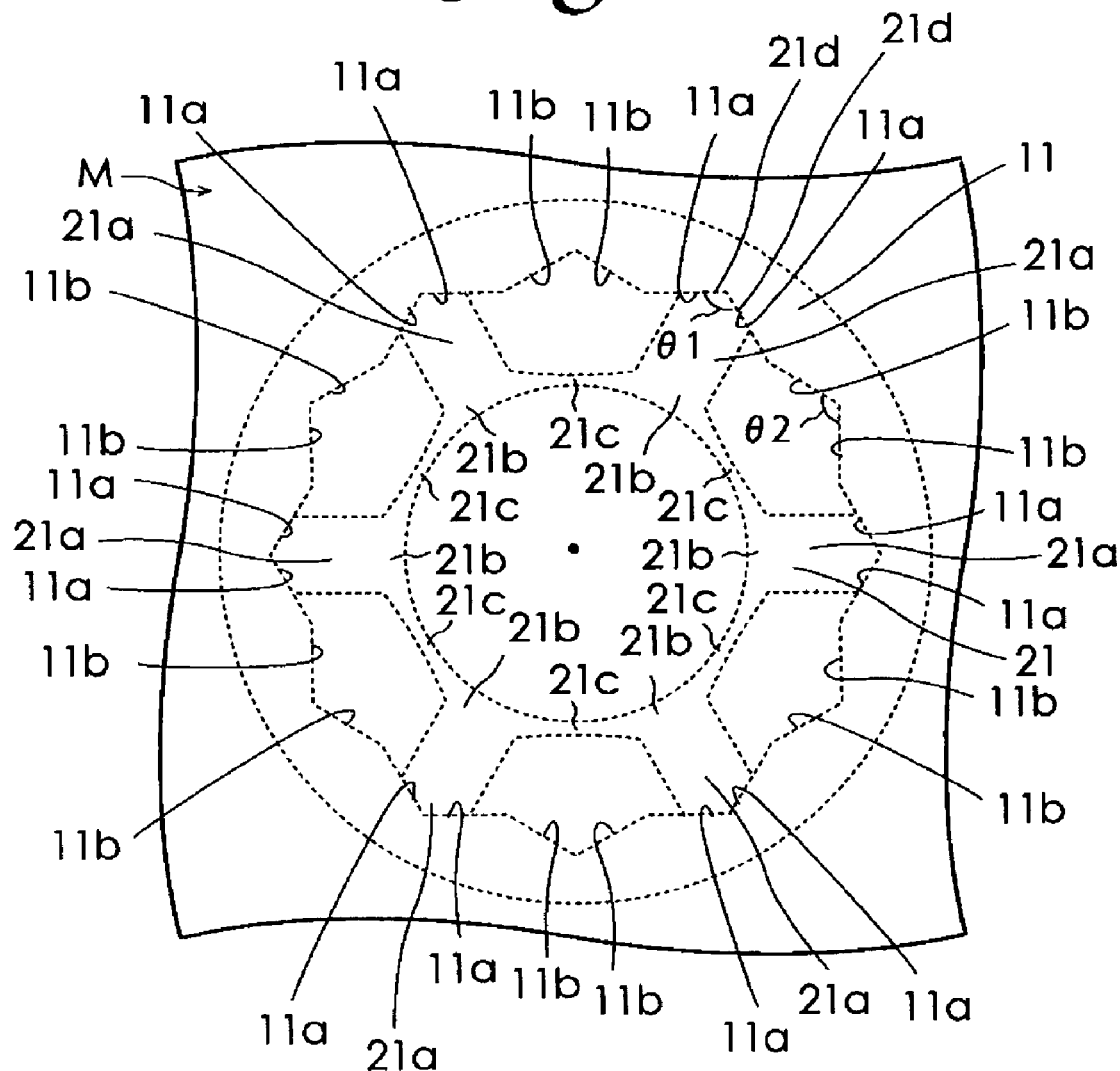
FIG. 3 is a diagram for explaining how a steel plate material is punched into a magnetic steel plate for a yoke and a magnetic steel plate for a magnetic pole constituent member used in the stator shown in FIG. 1.

Like the yoke 7, the magnetic pole constituent member 9 is formed by lamination of a plurality of magnetic steel plates 21 for a magnetic pole. One magnetic steel plate 11 for a yoke that constitutes the yoke 7 and one magnetic steel plate 21 for a magnetic pole that constitutes the magnetic pole constituent member 9 are formed by punching one steel plate material M by a press, as shown in FIG. 3. The magnetic steel plate 11 for a yoke includes a flat-surface portion forming portion 11a that forms the flat-surface portion 7b of the yoke 7 and an inclined-flat-surface forming portion 11b that forms the inclined-flat-surface portion 7c of the yoke 7 on an inner side thereof.

The magnetic steel plate 21 for a magnetic pole includes a pole column forming portion 21a that forms the pole column 13, a magnetic pole surface forming portion forming portion 21b that forms the magnetic pole surface forming portion 15, and a connecting forming portion 21c that forms a connecting section 17. The pole column forming portion 21a includes an inclined-surface forming portion 21d that forms the inclined-surface 13b. Then, some parts of adjacent two flat-surface forming portions 11a of the magnetic steel plate 11 for a yoke and adjacent two inclined-surface forming portions 21d of the magnetic steel plate 21 for a magnetic pole are cut by the press. The pole columns 13 and the yoke 7 are connected in a later process so that the inclined-surface forming portion 21d and the inclined-flat-surface forming portion 11b may abut against each other. Thus, according to how the yoke and pole column are connected, an angle θ1 formed between adjacent two inclined-surface forming portions 21d and an angle θ2 formed between adjacent two inclined-flat-surface forming portions 11b may be defined as necessary. When the angle θ1 is defined to be substantially equal to the angle θ2, or when the angle θ1 is defined to be slightly larger than the angle θ2, the pole columns 13 and the yoke 7 may be tightly fitted together.

Figure 4:
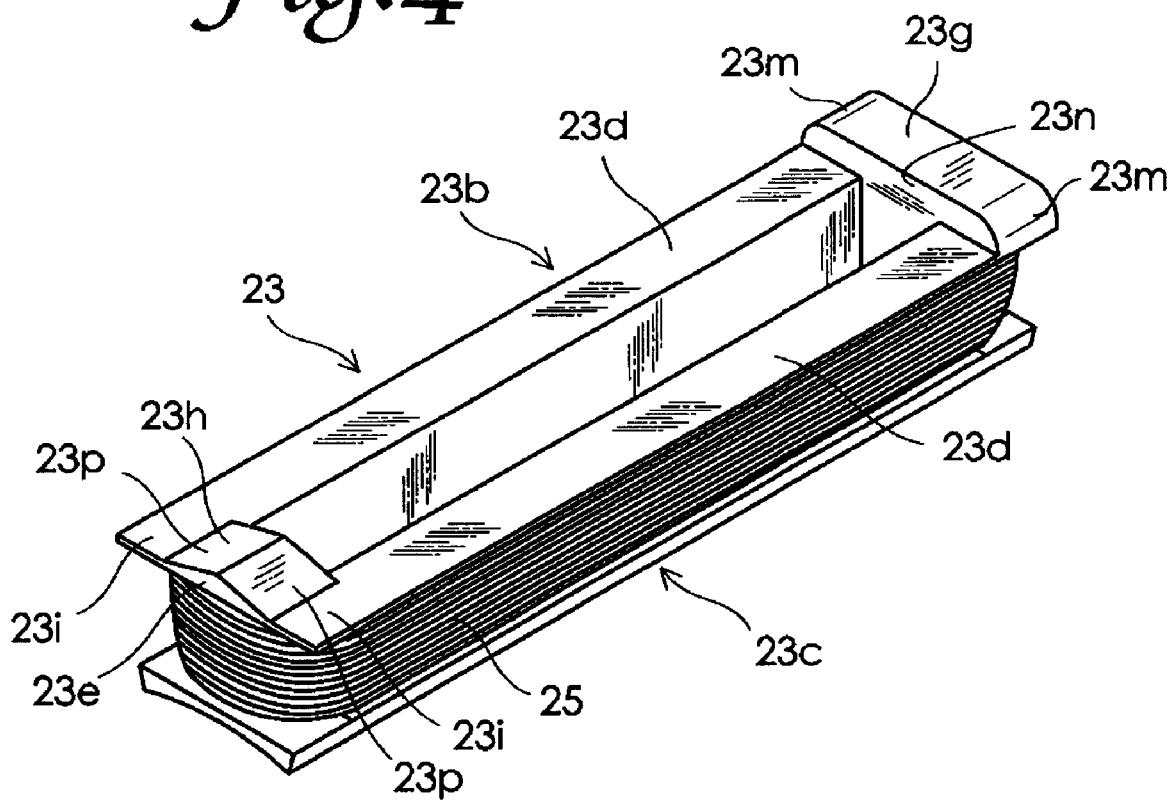
FIG. 4 is a perspective view of an excitation winding portion used in the stator shown in FIG. 1.
Figure 5:
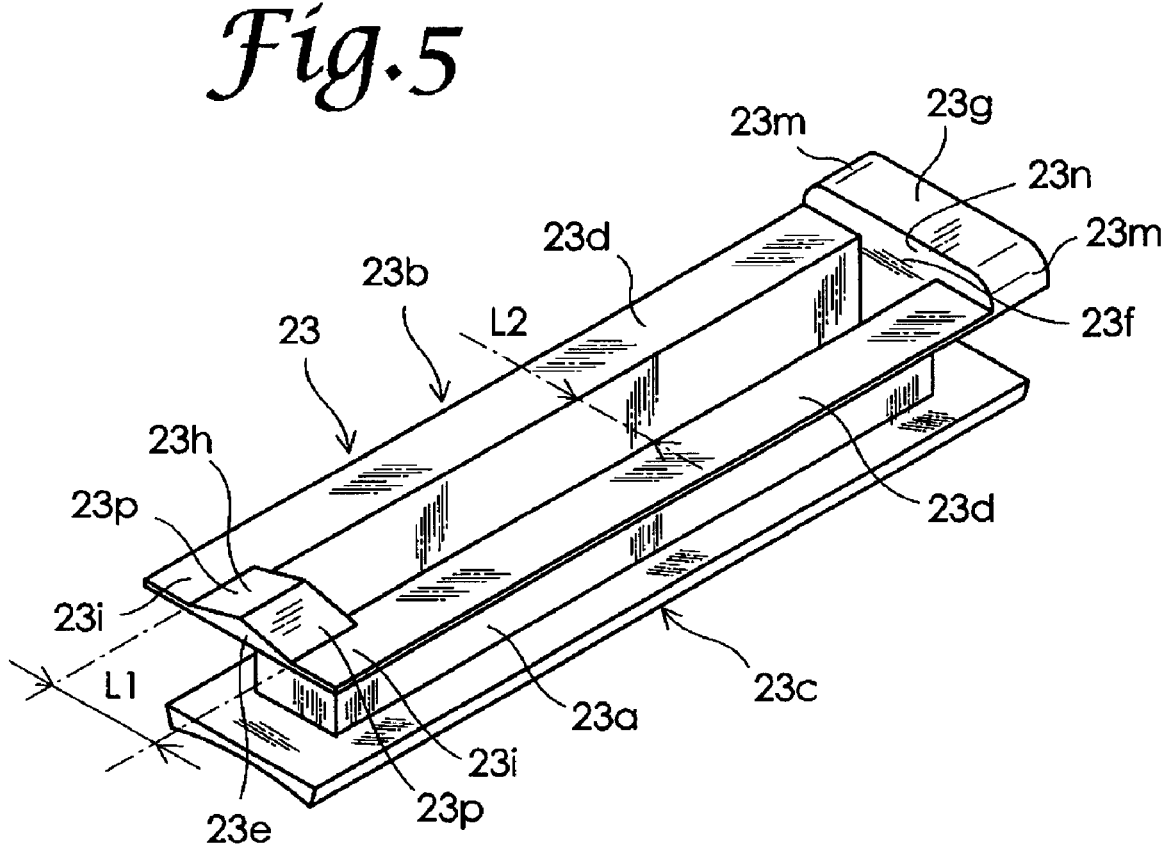
FIG. 5 is a perspective view of a bobbin used in the stator shown in FIG. 1.

As shown in FIGS. 2 and 4, the excitation winding portion 5 includes a bobbin 23 formed of an electric insulating material and fitted with the pole column 13, and a winding conductor 25 wound around the bobbin. As shown in FIG. 5, the bobbin 23 integrally includes a cylindrical portion 23a fitted with the pole column 13, a first flange portion 23b, and a second flange portion 23c. The first flange portion 23b is provided at one end portion of the cylindrical portion 23a and comes into contact with the yoke 7. The second flange portion 23c is provided at the other end portion of the cylindrical portion 23a and comes into contact with the magnetic pole surface forming portion 15. Inner surfaces of the first flange portion 23b and the second flange portion 23c, which are opposed to each other, extend in parallel. Then, the winding conductor 25 is regularly wound around the cylindrical portion 23a.

The first flange portion 23b includes a pair of or paired flat portions 23d that respectively come into contact with the paired flat-surface portions 7b of the yoke 7, a first connecting portion 23e that connects corresponding ends of the paired flat portions 23d, and a second connecting portion 23f that connects other corresponding ends of the paired flat portions 23d. A stopper portion 23g is integrally formed at the second connecting portion 23f. When the outer end raised portion 13a) of the pole column 13 is completely fitted into the fitting recessed portion 7a, the stopper portion 23g abuts against the yoke 7. The stopper portion 23g is integrally formed over the entire second connecting portion 23f. Accordingly, due to presence of the stopper portion 23g, the thickness of the second connecting portion 23f is uniformly increased, and mechanical strength of the second connecting portion 23f is increased. In this embodiment, an outer surface of each end portion 23m of the stopper portion 23g is rounded or curved. The end portions 23m are arranged in the circumferential direction of the yoke.

A projecting portion 23h which projects toward the yoke 7 is integrally provided at the first connecting portion 23e. The projecting portion 23h has a triangular cross-section taken in an orthogonal direction orthogonal to the laminating direction of the magnetic steel plates 21 and parallel to the magnetic steel plates 21. The triangular cross-section is geometrically similar in shape to a cross-section of the fitting recessed portion 7a taken in the orthogonal direction. For this reason, the projecting portion 23h has an outer surface formed of two inclined surfaces 23p. The cross-section of the projecting portion 23h is substantially the same in size or slightly smaller than the cross-section of the fitting recessed portion 7a. With this arrangement, when the outer ends of six pole columns 13 of the magnetic pole constituent member 9 respectively come into engagement with the six fitting recessed portions 7a, the projecting portion 23h passes through the fitting recessed portion 7a and then comes out of an opening portion of the fitting recessed portion 7a that opens toward one side of the laminating direction. As a result, the outer surface formed of the two inclined surfaces 23p is also exposed outside the fitting recessed portion 7a. In this embodiment, the cross-section of the projecting portion 23h is defined in shape so that, when the outer ends of the pole columns 13 are respectively fitted into the fitting recessed portions 7a, an inner surface of the fitting recessed portion 7a and the outer surface (or the paired inclined surfaces 23p) of the projecting portion 23h come into contact with each other. As described above, the pair of groove-like spaces 19 that extend in the laminating direction are formed between the pole column 13 and some parts of the paired inclined-flat-surface portions 7c. Thus, a length L1 of the bottom of the projecting portion 23h which is integral with the first connecting portion 23e in the circumferential direction of the yoke 7 is longer than a length L2 between the paired flat portions 23d.

In the stator core 3 in this embodiment, as shown in FIG. 2, a distance between an apex of one end corner portion of the pole column 13 and a center point C of the stator core 3 is designated by R. Then, a width in a direction orthogonal to a direction that extends between the outer end and the inner end of the pole column 13 is designated by T, a distance between the center point C and a base of the triangular raised portion 13a of the pole column 13 is designated by x, and a distance between the center point C and a point at which one side of a regular hexagon crosses an imaginary line orthogonal to that one side of a regular hexagon in the inner peripheral portion of the yoke 7 and passing through the center point C is designated by H. The number of excitation winding portions is denoted by N. In this embodiment, N is six. Then, the width T, the distance R, and the number N satisfy the relationship of $T \leq 2R(1-\cos(\pi/N))/\tan(\pi/N)$. Further, the distances H, x, and R satisfy the relationship of $H<x<R$.

Figure 6:
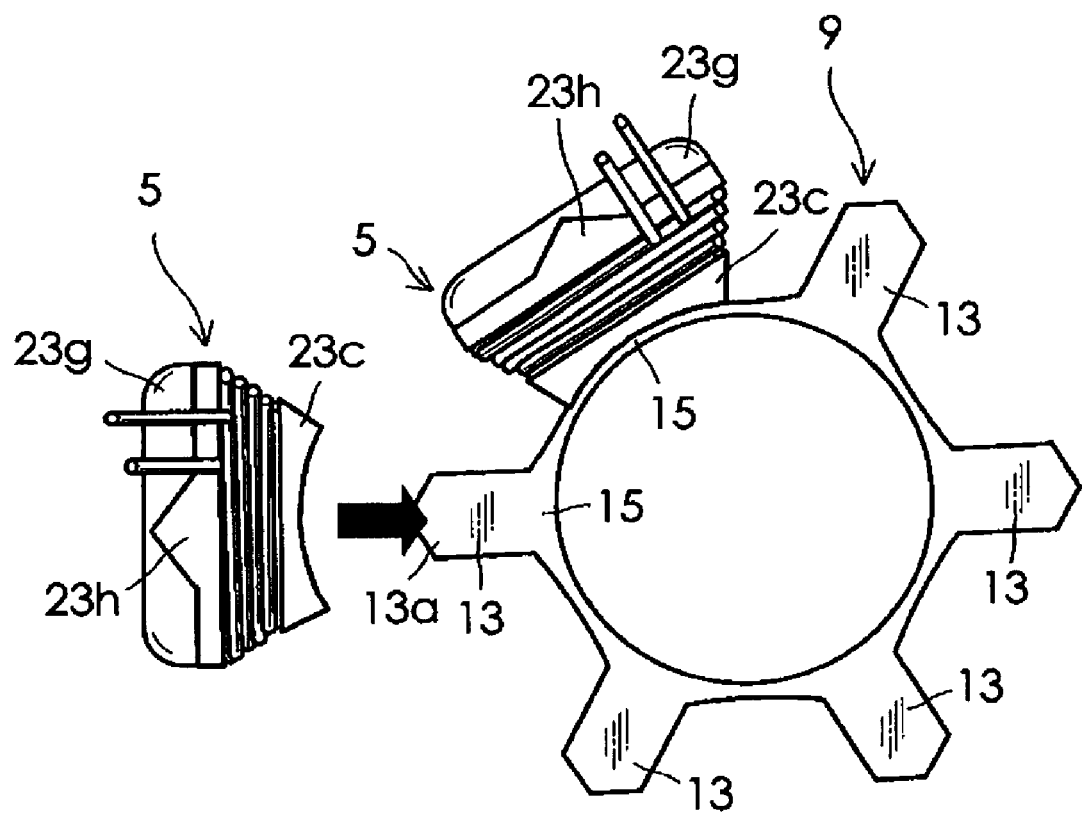
FIG. 6 is a diagram for explaining how the stator shown in FIG. 1 is assembled.
Figure 7A:
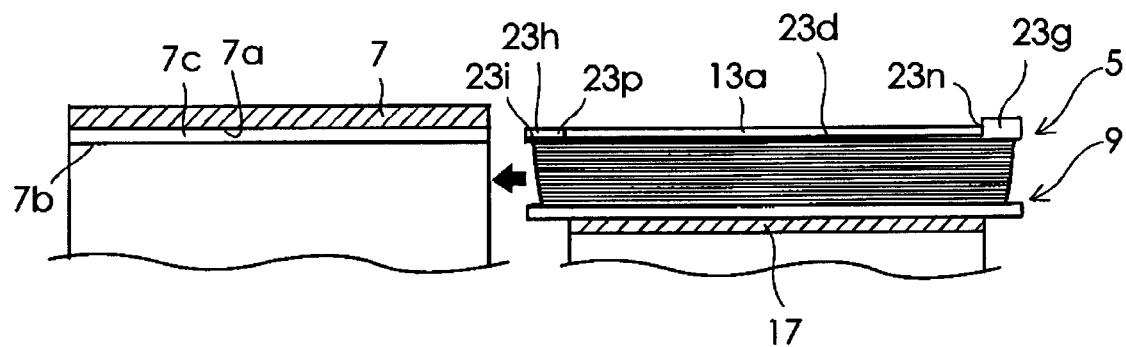
FIG. 7A is a diagram for explaining how the stator shown in FIG. 1 is assembled.
Figure 7B:
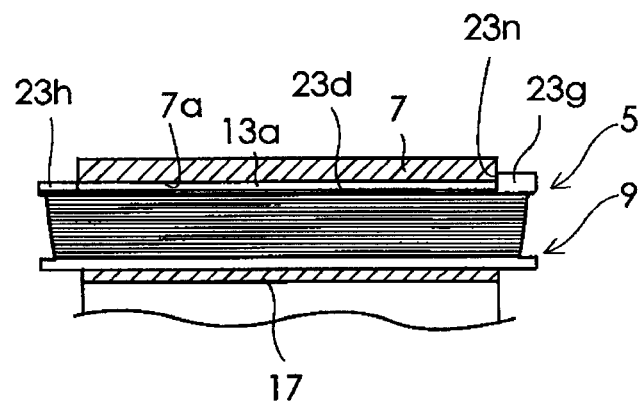
FIG. 7B is a diagram for explaining how the stator shown in FIG. 1 is assembled.

In this embodiment, the stator 1 was assembled as follows. First, the winding conductor 25 was wound around the bobbin 23, thereby forming each excitation winding portion 5. Next, as shown in FIG. 6, the excitation winding portions 5 were fitted into the pole columns 13 of the magnetic pole constituent member 9, respectively. With this arrangement, the second flange portions 23c of the bobbins 23 come into contact with the magnetic pole surface forming portions 15 of the magnetic pole constituent member 9, respectively. Next, as shown in FIGS. 7A and 7B, the raised portions 13a of the pole columns 13 with the excitation winding portions 5 mounted thereon are fitted into the fitting recessed portions 7a of the yoke 7, respectively, thereby fitting the magnetic pole constituent member 9 with the excitation winding portions 5 mounted thereon to the yoke 7. When assembling the stator, the projecting portion 23h passes through the fitting recessed portion 7a and comes out of the fitting recessed portion 7a while the paired inclined surfaces 23p are in contact with the inner surface of the fitting recessed portion 7a. When the projecting portion 23h comes out of the fitting recessed portion 7a, a pair of portions 23i of the first connecting portion 23e respectively located on either side of the projecting portion 23h (which are flat portions continuous with the paired flat portions 23d) passes through the yoke 7 and comes out of the yoke 7 while contacting with the paired flat-surface portions 7b formed on an inner peripheral surface of the yoke 7. In this state, the major parts of the paired flat portions 23d of the bobbin 23 comes into contact with the paired flat-surface portions 7b that forms a part of the inner peripheral surface of the yoke 7. Further, an end surface 23n of the stopper portion 23g, located on a side of the pole column 13, abuts against one side surface of the yoke 7. With this arrangement, the magnetic pole constituent member 9 may be properly positioned relative to the yoke 7.

In the stator for a motor in this embodiment, the projecting portion 23h is integrally provided at the first connecting portion 23e of the bobbin 23. Accordingly, the thickness of the first connecting portion 23e of the first flange portion 23b is increased due to presence of the projecting portion 23h. Thus, mechanical strength of the first flange portion 23b may be increased. Accordingly, when the winding conductor 25 is wound around the bobbin 23, deformation and breakage of the bobbin may be prevented, while keeping large the volume which is occupied by the winding conductor 25 wound around the bobbin.

Figure 8:
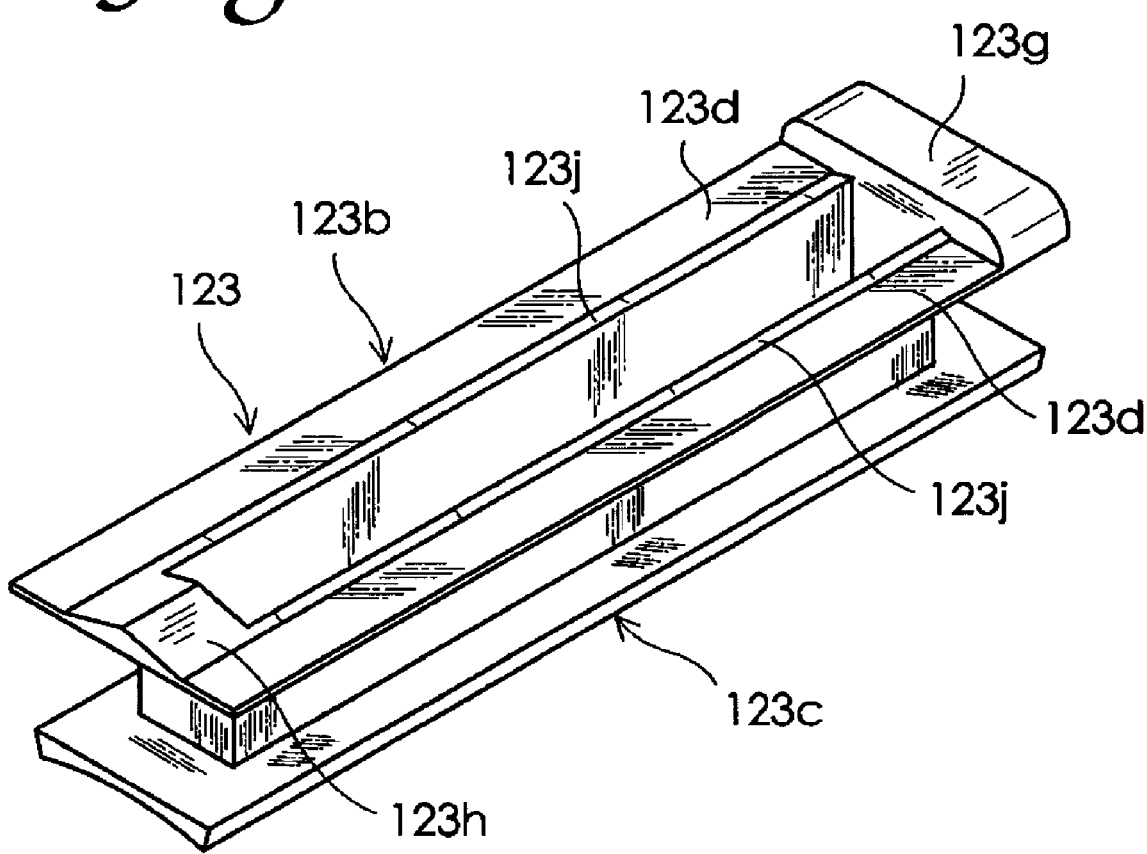
FIG. 8 is a perspective view of a bobbin used in a stator for a motor according to another embodiment of the present invention.

FIG. 8 is a perspective view of a bobbin 123 used in a stator for a motor according to another embodiment of the present invention. The bobbin 123 in this embodiment has a pair of or paired ribs 123j at a pair of or paired flat portions 123d, respectively. Except this respect, the bobbin 123 is of the same configuration as the bobbin 23 shown in FIG. 5. For this reason, reference numerals calculated by adding 100 to reference numerals shown in FIG. 5 are assigned to same members as those of the bobbin 23 in FIG. 5, respectively, and a description of the same members will be omitted. In this embodiment, the paired ribs 123j each have a cross-sectional shape of a right-angled triangle, and are respectively fitted into the pair of groove-like spaces 19 (refer to FIG. 2), when the outer ends of the six pole columns 13 of the magnetic pole constituent member 9 are fitted into the six fitting recessed portions 7a, respectively.

Figure 9:
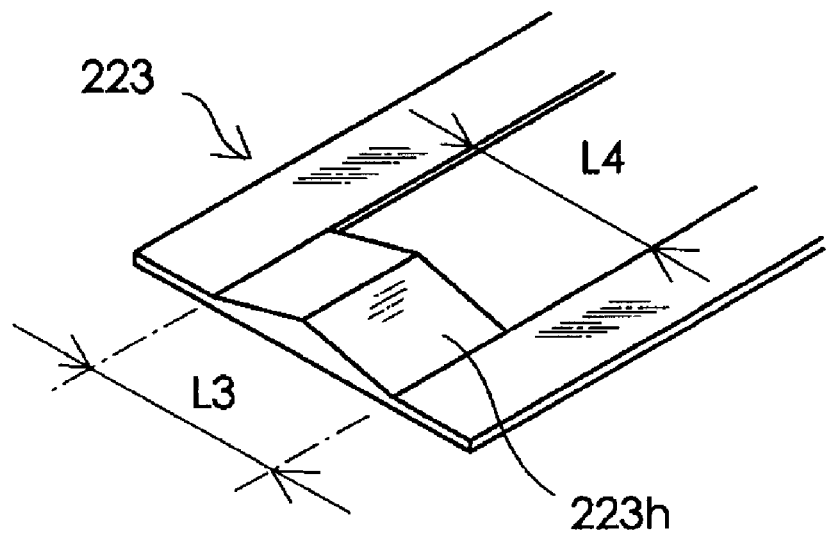
FIG. 9 is a perspective view of a projecting portion of a bobbin used in a stator for a motor according to a further embodiment of the present invention.

FIG. 9 is a perspective view of a projecting portion 223h of a bobbin 223 used in a stator for a motor according to a further embodiment of the present invention. Reference numerals calculated by adding 200 to the reference numerals shown in FIG. 5 are assigned to same members as those of the bobbin 23 shown in FIG. 5, respectively, and a description of the same members will be omitted. The projecting portion 223h has a cross-section of a triangular shape that is geometrically similar in shape to the cross-section of the fitting recessed portion 7a taken in the orthogonal direction described above. However, in this embodiment, a length L3 of the bottom of the projecting portion 223h that is integral with the first connecting portion 23e in the circumferential direction of the yoke 7 is equal to a length L4 between the paired flat portions 23d. Accordingly, the projecting portion 223h in this embodiment has a smaller sectional area than the projecting portion 23h shown in FIG. 5.

Figure 10:
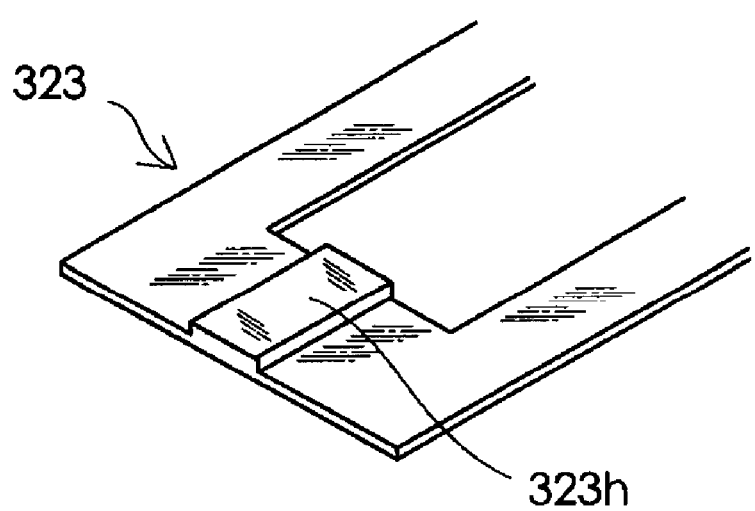
FIG. 10 is a perspective view of a projecting portion of a bobbin used in a stator for a motor according to yet another embodiment of the present invention.

FIG. 10 is a perspective view of a projecting portion 323h of a bobbin 323 used in a stator for a motor according to yet another embodiment of the present invention. Reference numerals calculated by adding 300 to the reference numerals shown in FIG. 5 are assigned to same members as those of the bobbin 23 in FIG. 5, respectively, and a description of the same members will be omitted. This projecting portion 323h has a rectangular parallelepiped shape. Accordingly, the projecting portion 323h has a rectangular cross-section having a sectional area smaller than that of the fitting recessed portion 7a taken in the orthogonal direction.

FIG. 11 is a perspective view of an excitation winding portion 405 used in a stator for a motor according to still another embodiment of the present invention. Reference numerals calculated by adding 400 to the reference numerals shown in FIG. 5 are assigned to same members as those of the bobbin 23 in FIG. 5, respectively, and a description of the same members will be omitted. In a bobbin 423 of the excitation winding portion 405, tapered surfaces 423j are respectively formed at both corner portions of a leading end region of a first connecting portion 423e in a width direction of the first connecting portion 423e, or corner portions of paired portions 423i. The distance between the tapered surfaces 423j increases more toward the paired flat portion 423ds. Accordingly, a width of a leading end region of the first connecting portion 423e, as measured in a direction in which the paired flat portions 423d are arranged, gradually increases more toward the paired flat portions 423d. The leading end region of the first connecting portion 423e includes a projecting portion 423h and the paired portions 423i. With this arrangement, when the magnetic pole constituent member 9 is fitted into the yoke 7, both corner portions of the leading end region of the first connecting portion 423e of the bobbin 423 may be prevented from abutting against the yoke 7 and then becoming an obstacle in fitting the magnetic pole constituent member 9 into the yoke 7. Though the tapered surfaces 423j in this embodiment are linearly inclined, the corner portions of the paired portions 423i may be rounded or curved into a convex shape.

While the preferred embodiments of the invention have been described with a certain degree of particularity with reference to the drawings, obvious modifications and variations are possible in light of the above teachings. It is therefore to be understood that within the scope of the appended claims, the invention may be practiced other than as specifically described.

What is claimed is:

1. A stator for a motor comprising:
   a stator core including an annular yoke and a magnetic pole constituent member fitted inside the annular yoke; and
   a plurality of excitation winding portions disposed at the magnetic pole constituent member,
   the yoke and the magnetic pole constituent member being respectively formed by lamination of a plurality of magnetic steel plates,
   the magnetic pole constituent member including:
      a plurality of pole columns disposed inside the annular yoke at intervals in a circumferential direction of the yoke and respectively mounted with the excitation winding portions, the pole columns each having an outer end connected to the yoke and an inner end located more inward than the outer end in a radial direction of the yoke;
      a plurality of magnetic pole surface forming portions respectively disposed at the inner ends of the pole columns, the magnetic pole surface forming portions each having a magnetic pole surface; and
      a plurality of connecting sections that respectively connect adjacent two of the magnetic pole surface forming portions,
   the yoke having an inner peripheral surface portion wherein a plurality of fitting recessed portions are formed so as to be open toward both sides of a laminating direction of the magnetic steel plates and also toward the magnetic pole constituent member, the fitting recessed portions being fitted with the outer ends of the pole columns, and wherein a plurality of paired flat-surface portions are also formed, the paired flat-surface portions being respectively continuous with an inner surface of the fitting recessed portion and respectively disposed on either side of the fitting recessed portion in the circumferential direction,
   the excitation winding portions each including a bobbin that is made of an insulating material and is fitted with the pole column, and a winding conductor wound around the bobbin,
   the bobbin integrally including:
      a cylindrical portion that is fitted with the pole column, and wound with the winding conductor;
      a first flange portion disposed at one end of the cylindrical portion and having paired flat portions that respectively come into contact with the paired flat-surface portions of the yoke; and
      a second flange portion disposed at the other end of the cylindrical portion and coming into contact with the magnetic pole surface constituent member,
   the first flange portion including a first connecting portion that connects corresponding ends of the paired flat portions and a second connecting portion that connects other corresponding ends of the paired flat portions,
   the first connecting portion integrally including a projecting portion that passes through the fitting recessed portion and comes out therefrom when the outer ends of the pole columns of the magnetic pole constituent member come into engagement with fitting recessed portions.

2. The stator for a motor according to claim 1, wherein a cross-section of the projecting portion, as taken in an orthogonal direction orthogonal to the laminating direction of the magnetic steel plates and parallel to the magnetic steel plates, is geometrically similar in shape to a cross-section of the fitting recessed portion as taken in the orthogonal direction.

3. The stator for a motor according to claim 2, wherein the cross-section of the projecting portion is defined in shape so that when the outer ends of the pole columns are fitted into the fitting recessed portions, the inner surface of the fitting recessed portion comes into contact with an outer surface of the projecting portion.

4. The stator for a motor according to claim 3, wherein the second connecting portion of the first flange portion integrally includes a stopper portion that abuts against the yoke when the outer ends of the pole columns are completely fitted into the fitting recessed portions.

5. The stator for a motor according to claim 4, wherein
   the paired flat portions of the bobbin are integrally provided with paired ribs extending along a through hole of the bobbin into which the pole column is fitted;
   the inner surface of the fitting recessed portion is formed of paired inclined-flat-surface portions respectively continuous with the paired flat-surface portions; and
   the paired inclined-flat-surface portions are defined in size so that a pair of spaces may respectively be formed between the paired inclined-flat-surface portions and the outer end of the pole column fitted into the fitting recessed portion, the paired ribs of the bobbin being respectively fitted into the pair of spaces.

6. The stator for a motor according to claim 5, wherein a leading end region of the first connecting portion is defined in shape so that a width of the leading end region of the first connecting portion, as measured in a width direction where the paired flat portions are disposed, gradually increases more toward the paired flat portions.

7. The stator for a motor according to claim 6, wherein tapered surfaces are formed at both corner portions, located in the width direction, of the leading end region of the first connecting portion, and the distance between the tapered surfaces increases more toward the paired flat portions.

8. The stator for a motor according to claim 1, wherein the second connecting portion of the first flange portion integrally includes a stopper portion that abuts against the yoke when the outer ends of the pole columns are completely fitted into the fitting recessed portions.

9. The stator for a motor according to claim 1, wherein the paired flat portions of the bobbin are integrally provided with paired ribs extending along a through hole of the bobbin into which the pole column is fitted;

the inner surface of the fitting recessed portion is formed of paired inclined-flat-surface portions respectively continuous with the paired flat-surface portions; and the paired inclined-flat-surface portions are defined in size so that a pair of spaces may respectively be formed between the paired inclined-flat-surface portions and the outer end of the pole column fitted into the fitting recessed portion, the paired ribs of the bobbin being respectively fitted into the pair of spaces.

10. The stator for a motor according to claim 1, wherein a leading end region of the first connecting portion is defined in shape so that a width of the leading end region of the first connecting portion, as measured in a width direction where the paired flat portions are disposed, gradually increases more toward the paired flat portions.

11. The stator for a motor according to claim 10, wherein tapered surfaces are formed at both corner portions, located in the width direction, of the leading end region of the first connecting portion, and the distance between the tapered surfaces increases more toward the paired flat portions.

* * * * *